C. WENDELKEN.
CHECK WRITER.
APPLICATION FILED MAY 24, 1918.
1,340,429.
Patented May 18, 1920.
11 SHEETS—SHEET 1.
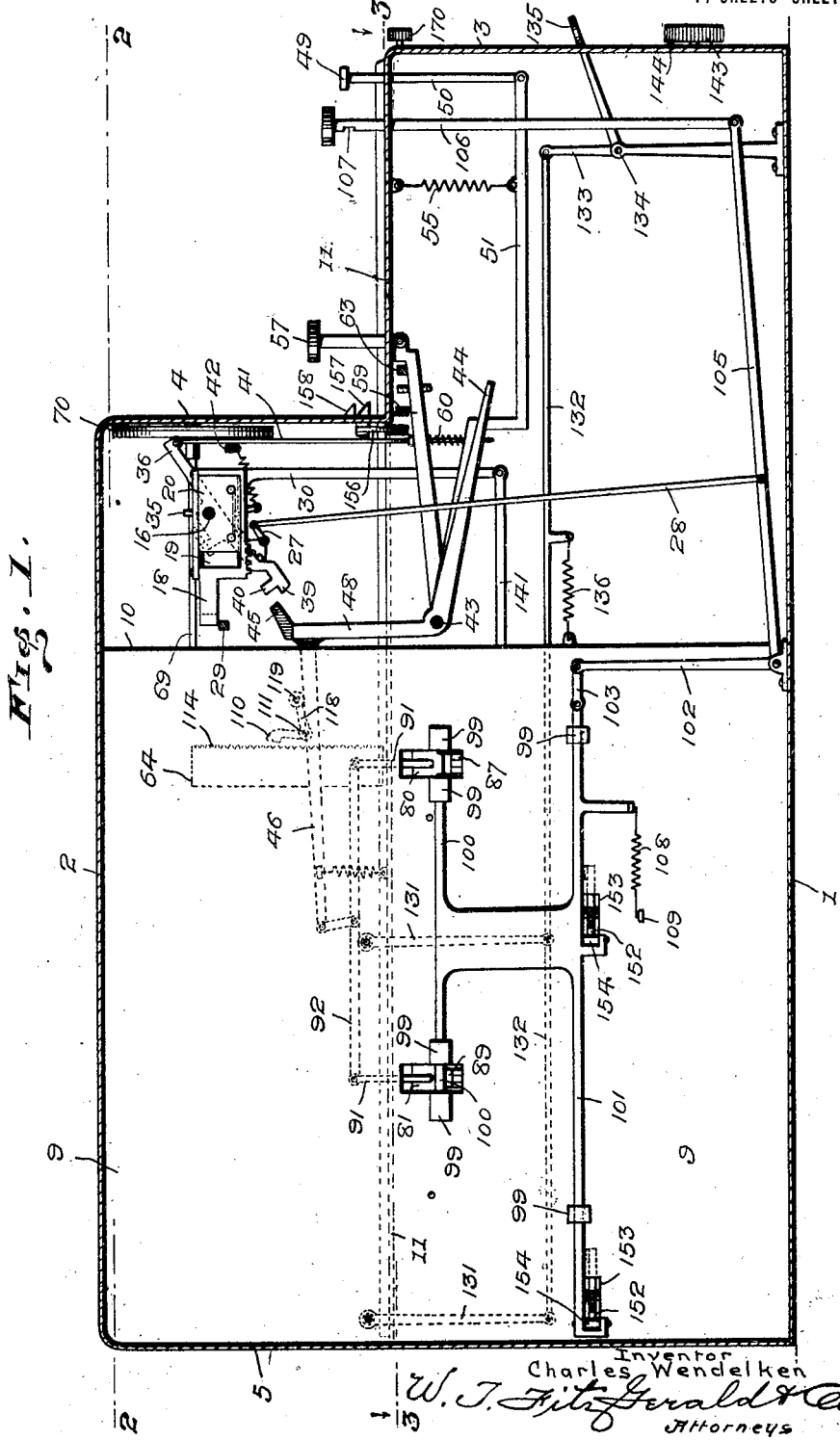
Inventor
Charles Wendelken
W. T. FitzGerald & Co.
Attorneys C. WENDELKEN.
CHECK WRITER.
APPLICATION FILED MAY 24, 1918.
1,340,429.
Patented May 18, 1920.
11 SHEETS—SHEET 2.
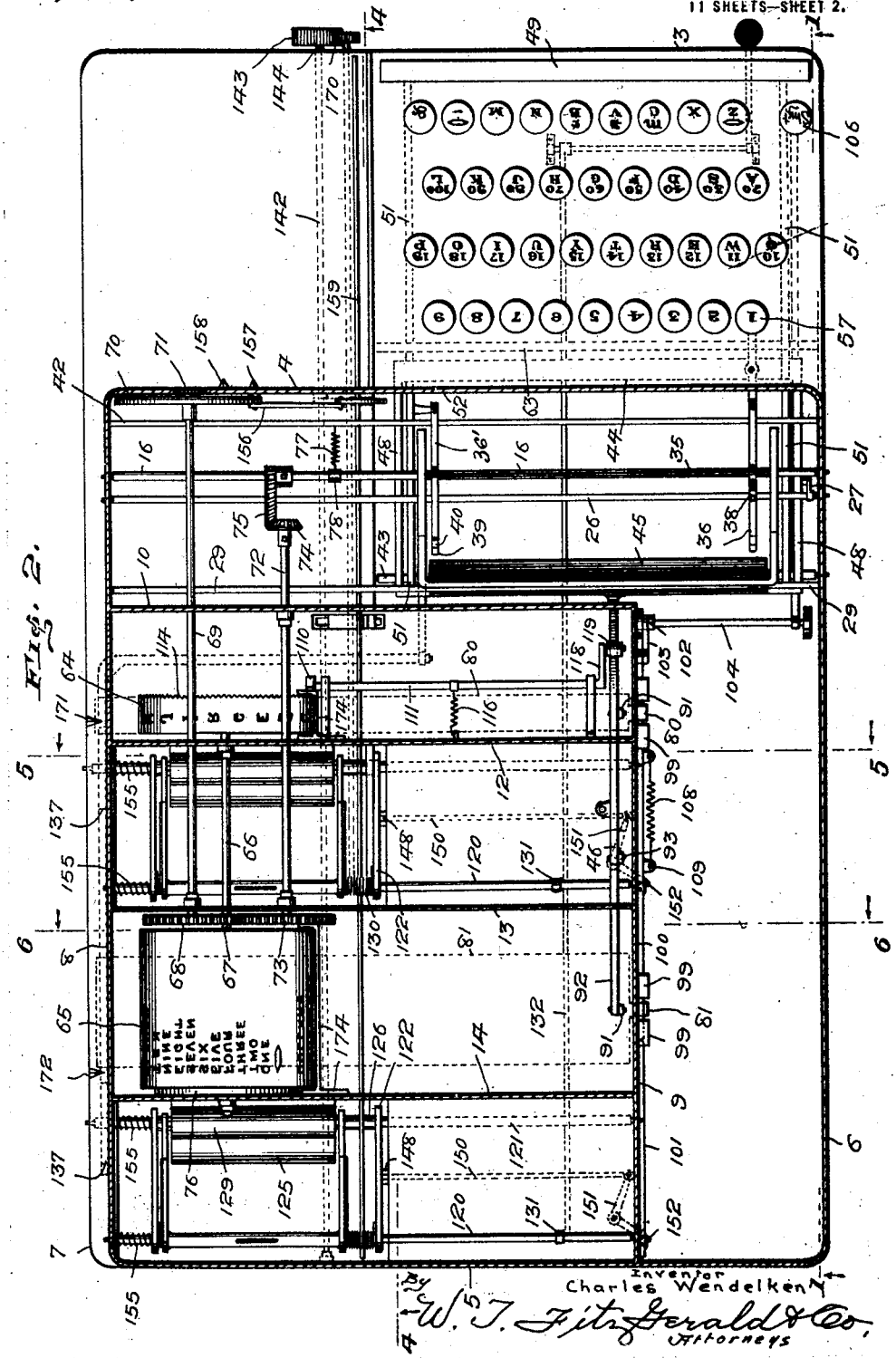

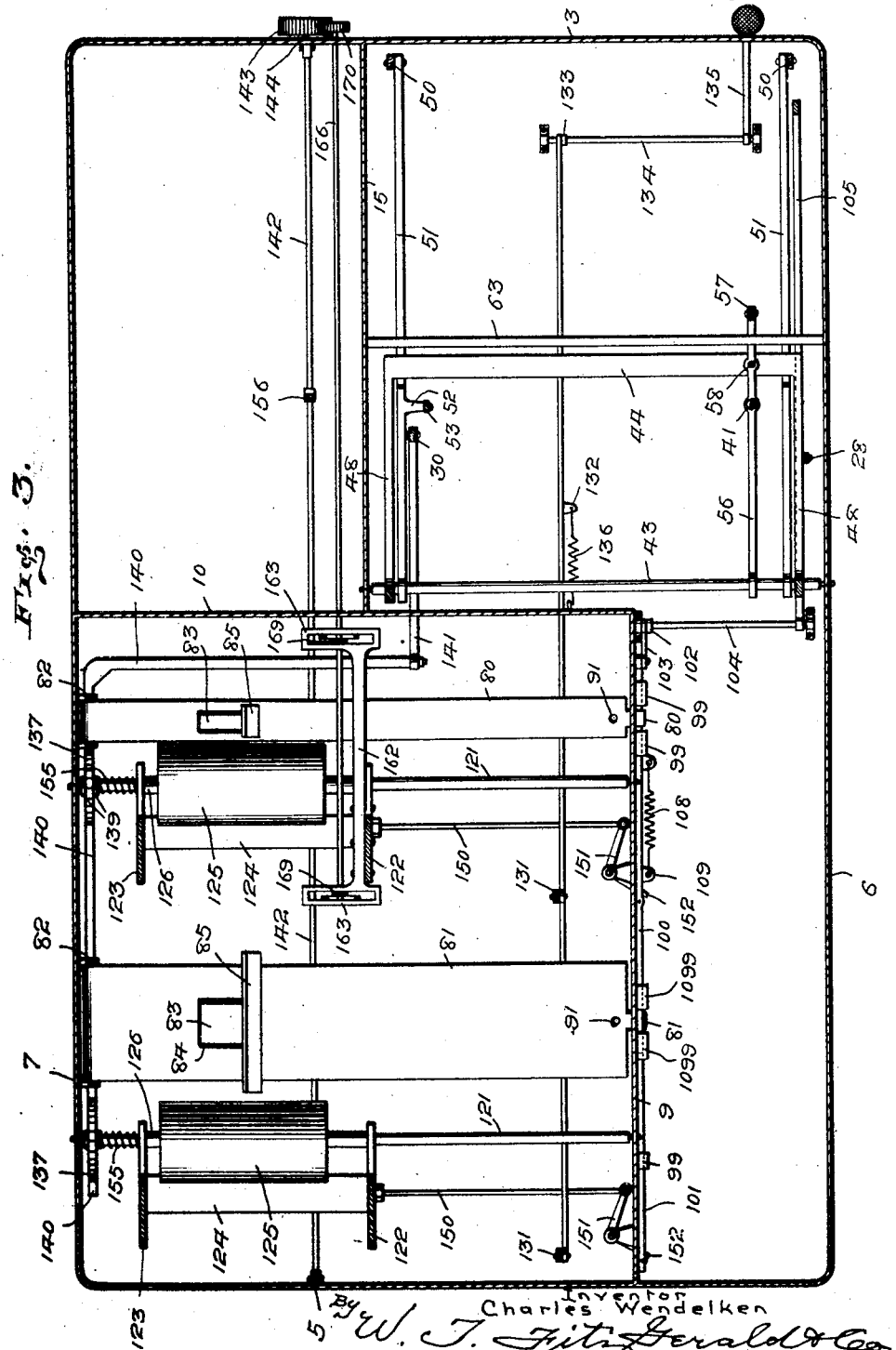

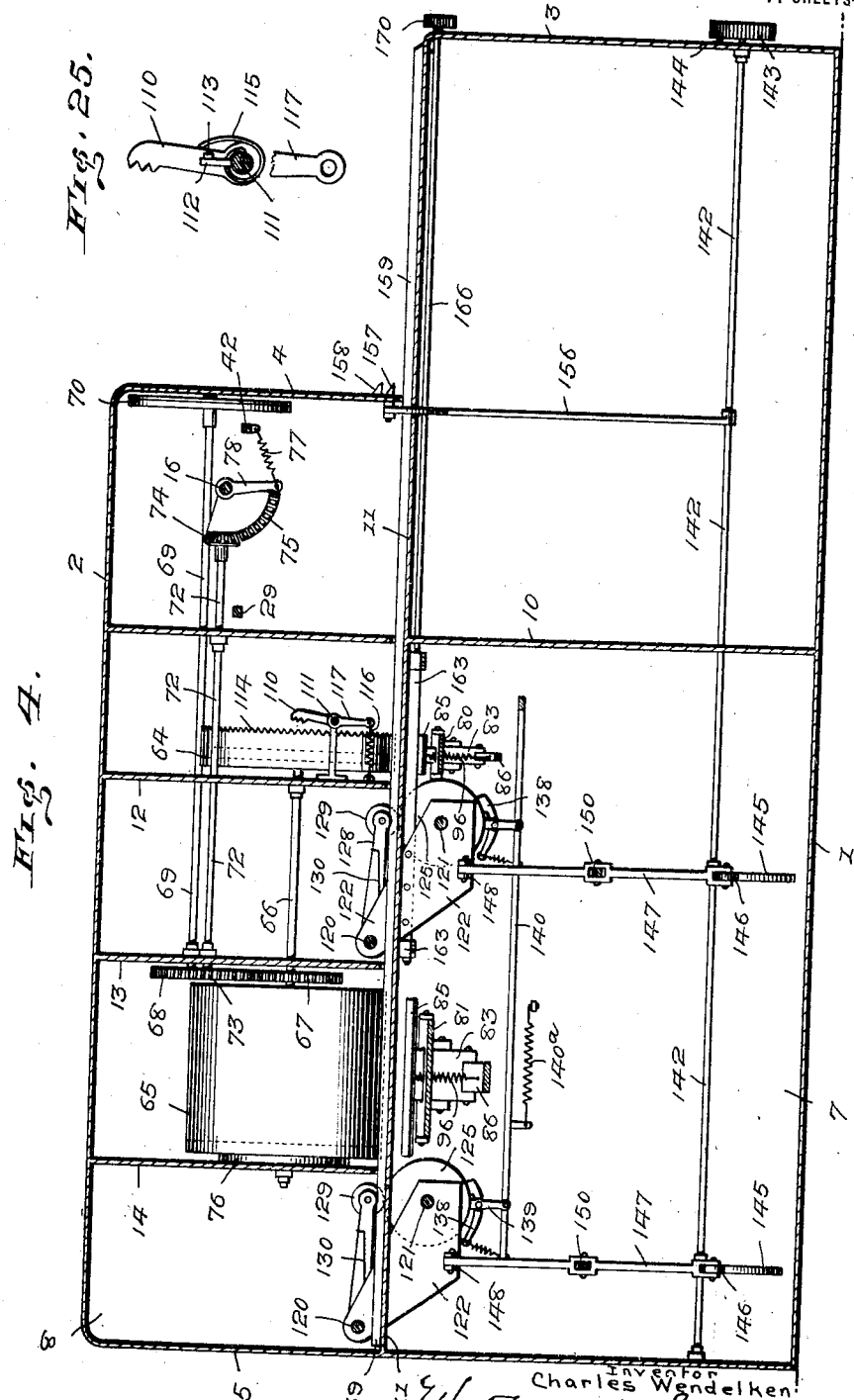

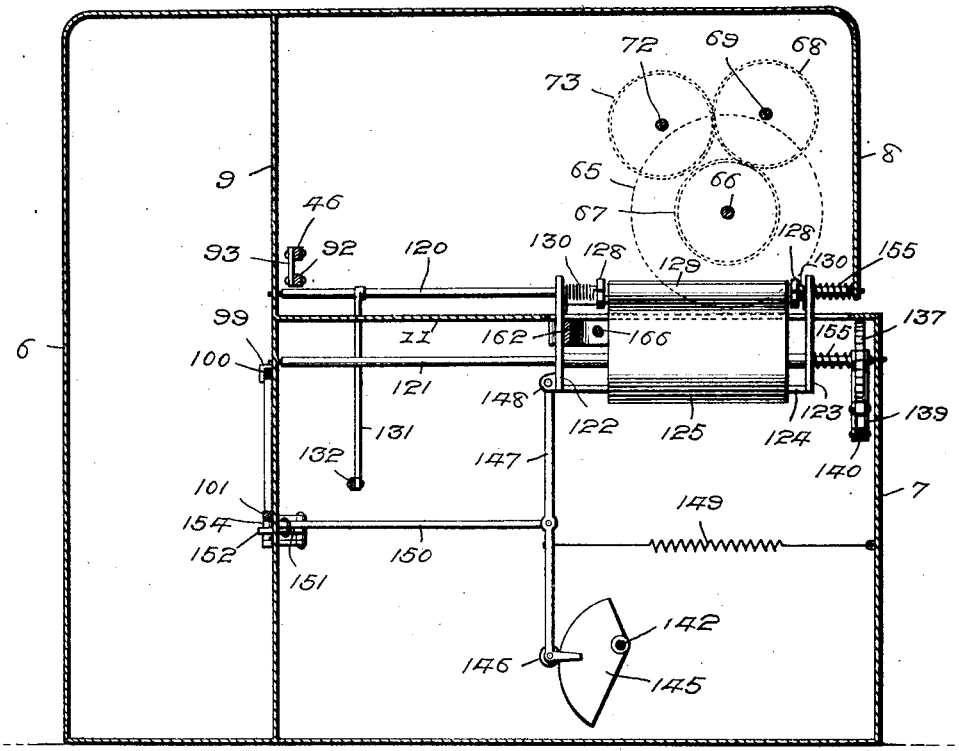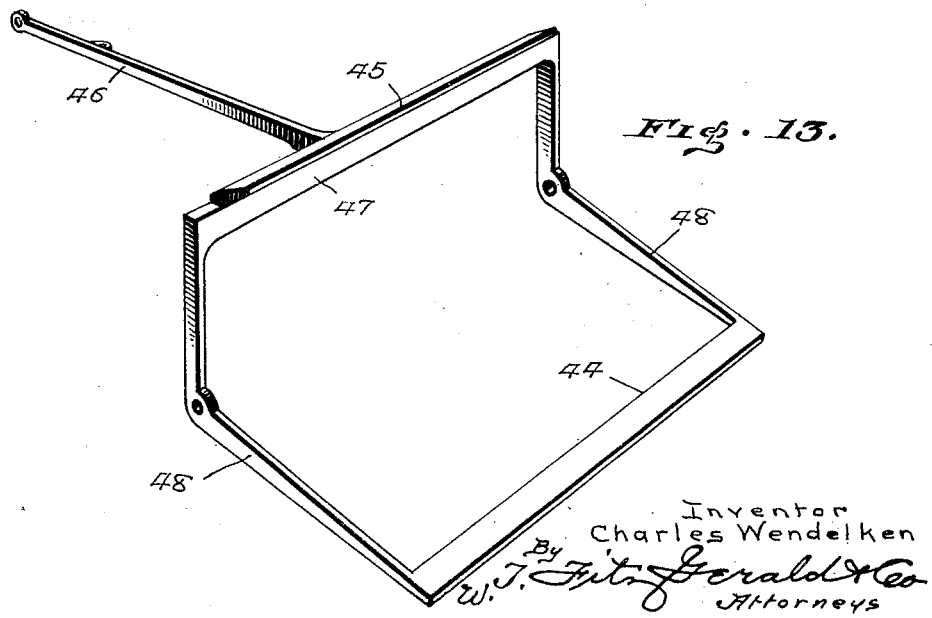

C. WENDELKEN.
CHECK WRITER.
APPLICATION FILED MAY 24, 1918.
1,340,429.
Patented May 18, 1920.
11 SHEETS—SHEET 6.
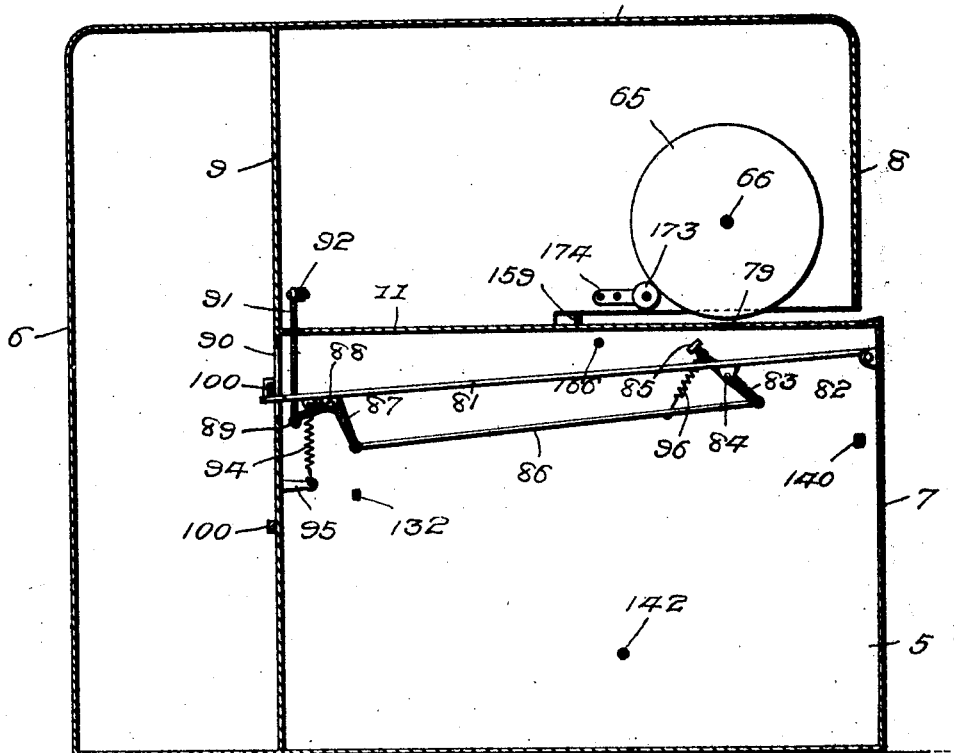
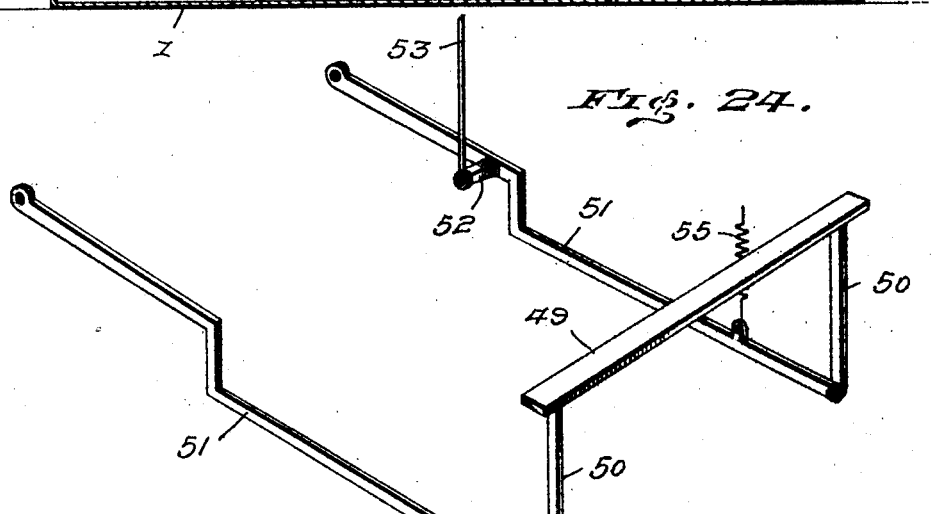
Inventor
Charles Wendelken
By
W. J. FitzGerald & Co
Attorneys

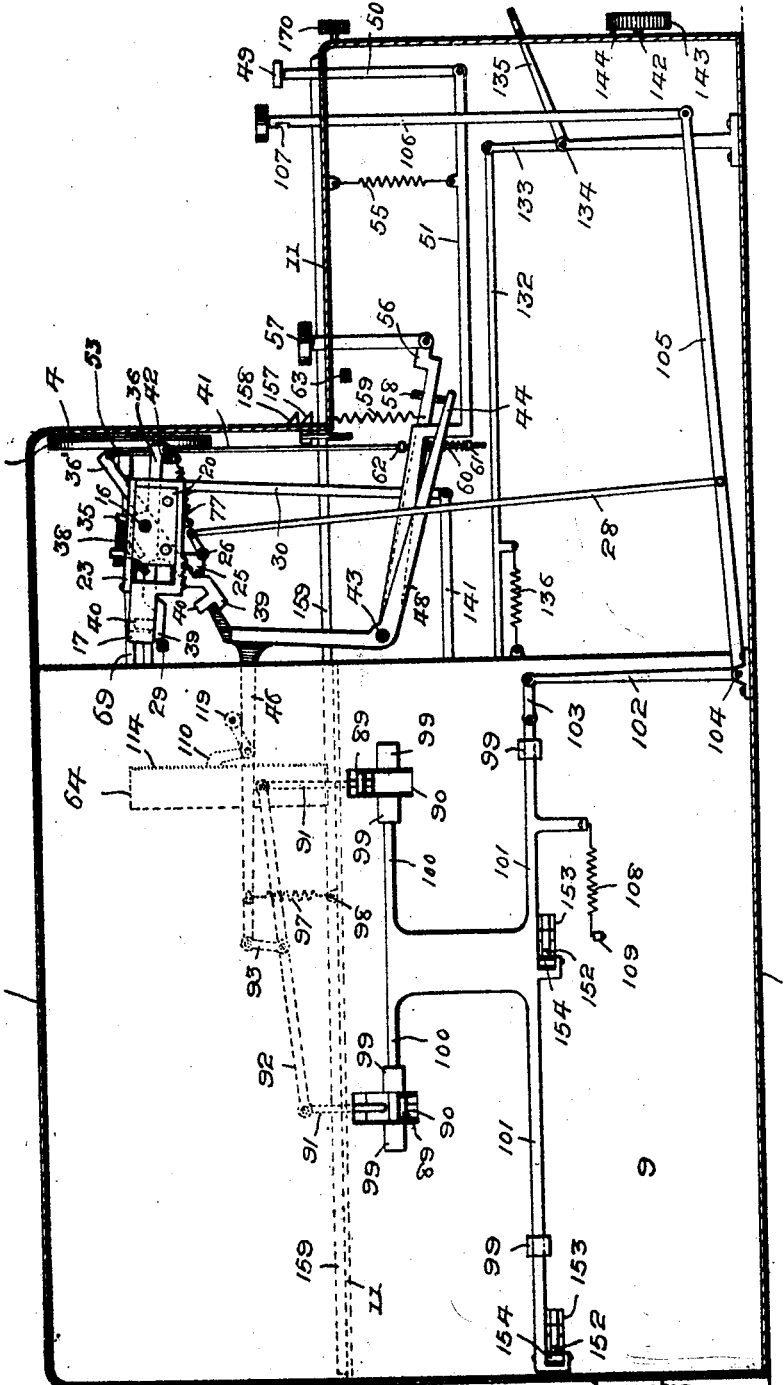

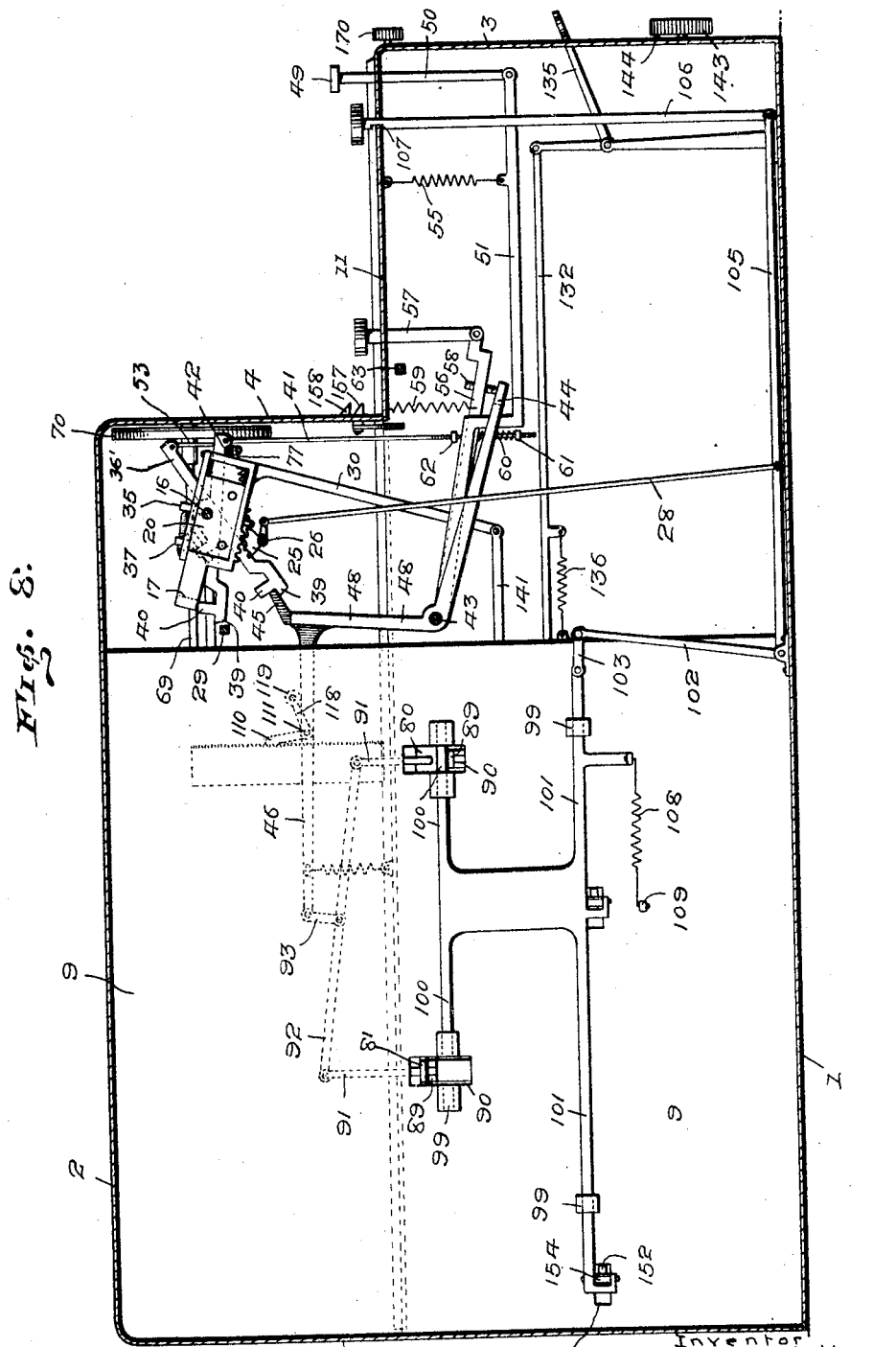

C. WENDELKEN.
CHECK WRITER.
APPLICATION FILED MAY 24, 1918.
1,340,429.
Patented May 18, 1920.
11 SHEETS—SHEET 9.
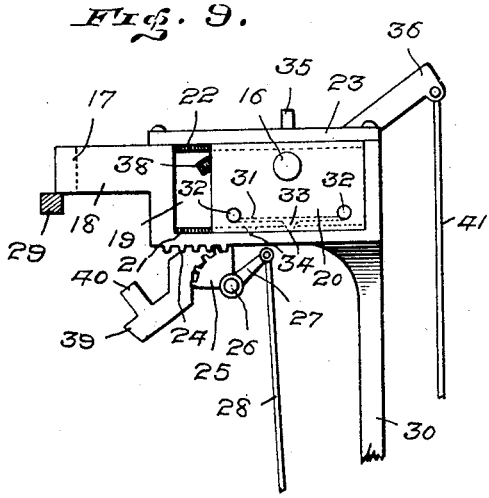
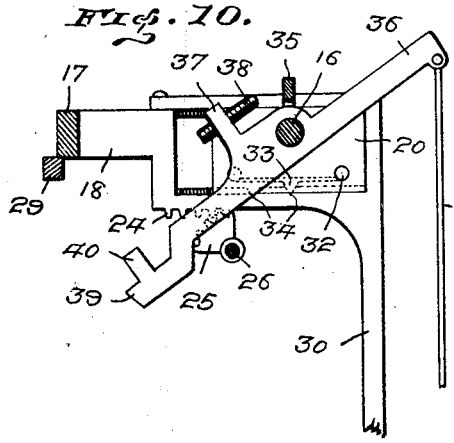
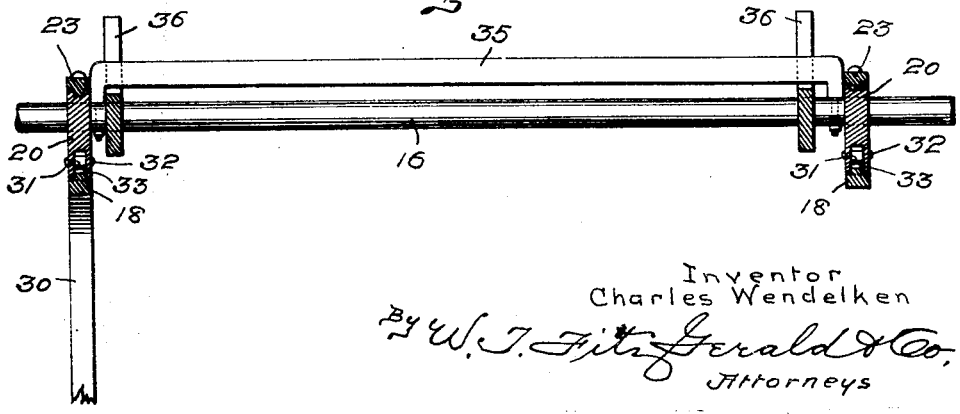
Inventor
Charles Wendelken
By W. J. FitzGerald & Co.
Attorneys

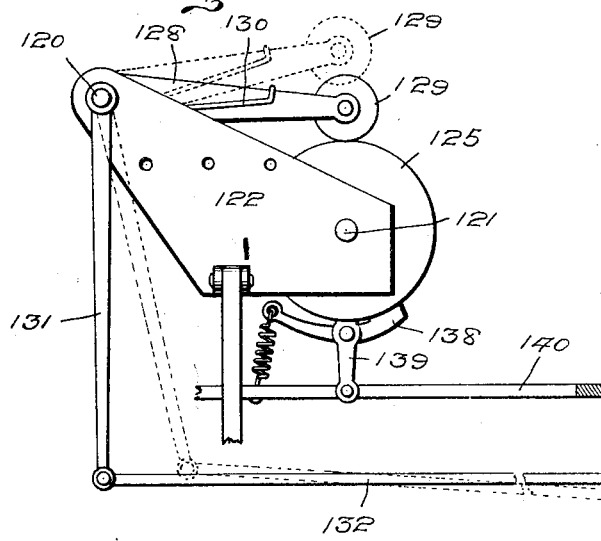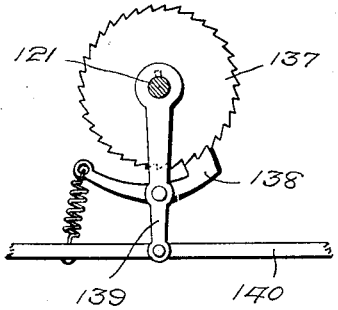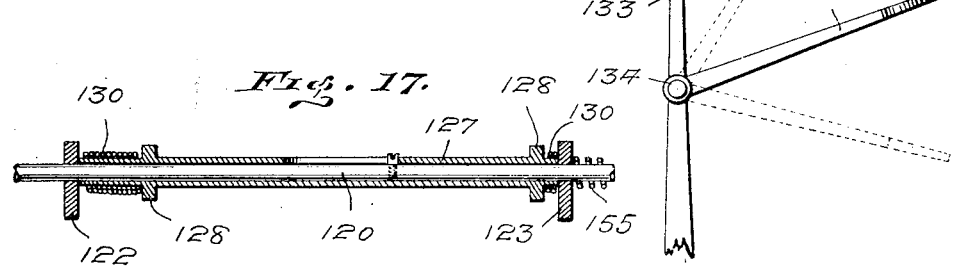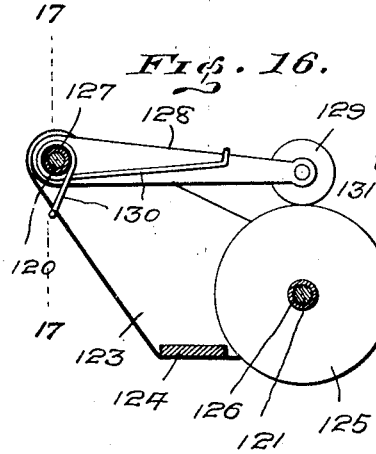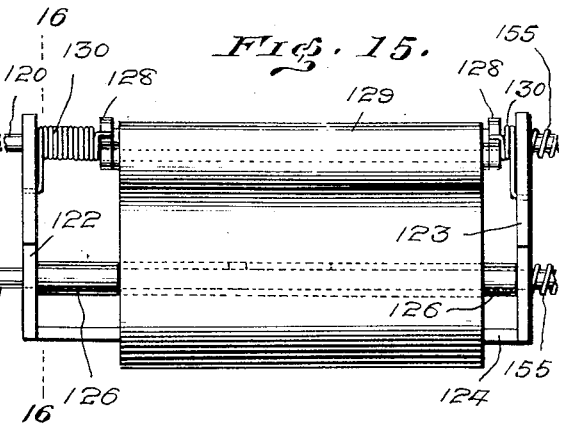

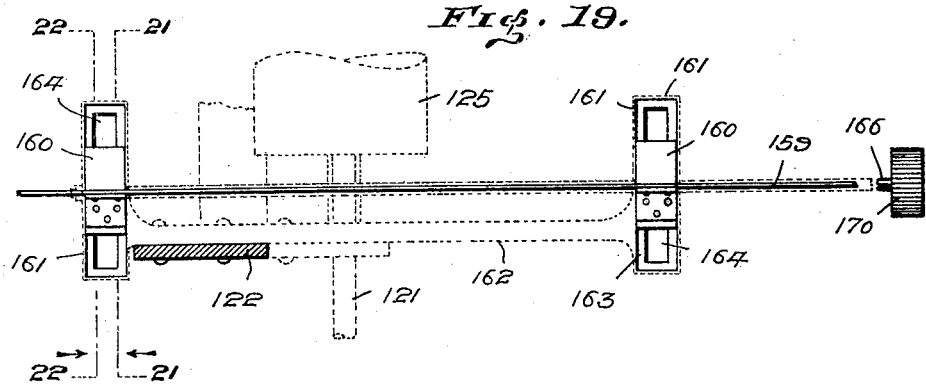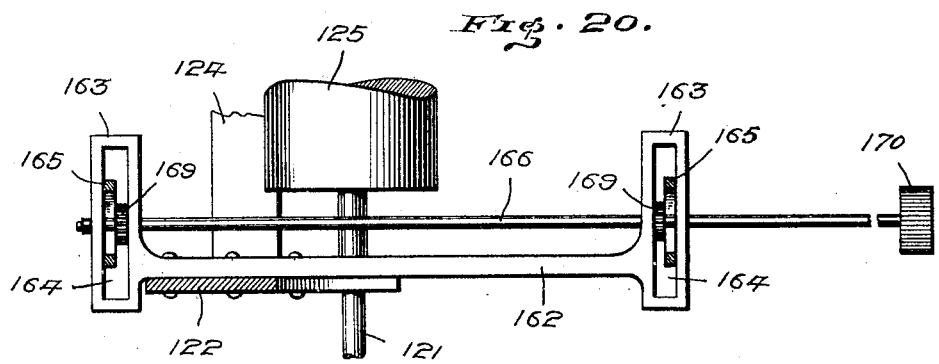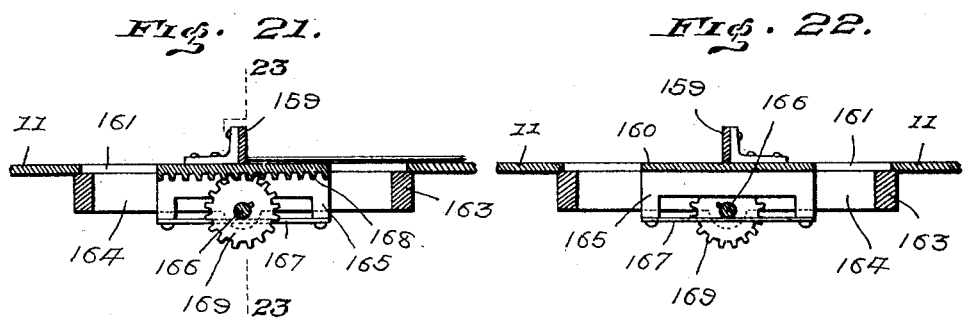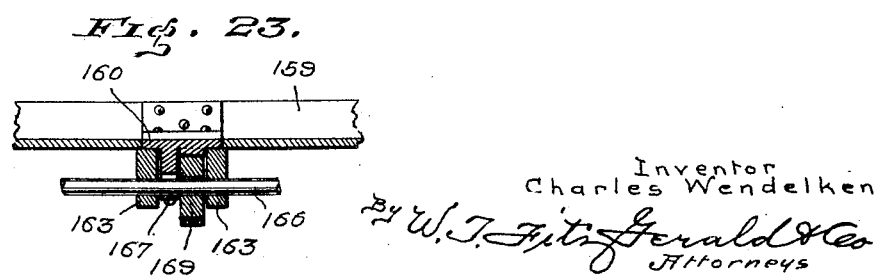

UNITED STATES PATENT OFFICE.

CHARLES WENDELKEN, OF ROBSTOWN, TEXAS.

CHECK-WRITER.

1,340,429.  Specification of Letters Patent.  Patented May 18, 1920.

Application filed May 24, 1918. Serial No. 236,360.

*To all whom it may concern:*

Be it known that I, CHARLES WENDELKEN, a citizen of the United States, residing at Robstown, in the county of Nueces and State of Texas, have invented certain new and useful Improvements in Check-Writers; and I do hereby declare the following to be a full, clear, and exact description of the invention, such as will enable others skilled in the art to which it appertains to make and use the same.

This invention relates to a bank check writer, being an improvement over the machine disclosed in the copending application Serial No. 133,934, filed May 24, 1917, and has for its principal object to provide a typewriting device of this character in which a blank check or other sheet may be inserted and the name of the payee or other data typewritten thereon and the amount in figures typewritten on the same line following the name, and whereby the amount may be typewritten by plural type at another position or on the next line below the one that contains the name of the payee.

Another object of the invention is the provision of a machine of the above stated character embodying a pair of rotatable type cylinders and a plurality of keys operatively connected to the type cylinders whereby the latter may be rotated to bring the desired type, or the type corresponding to the key depressed, into a position to make an impression upon the bank check or other paper that may be inserted into the machine.

Another object of the invention is to provide one of the type cylinders with single characters and the other with words or plural type, suitable means being provided for selectively actuating either platen and bringing the same into printing engagement with the corresponding type cylinder.

A further object of the invention is to provide a presser foot or platen for coöperating with the type of each type cylinder whereby when the keys are actuated it will coöperate with the type to produce an impression through or upon the bank check that can not be altered without detection.

A further object of the invention is to provide the machine with adjustable means whereby the payee's name, the amount in figures on the same line following the name and the amount on the line below that on which the payee's name is written, may be typewritten accurately on the respective lines in check, irrespective of the spacing between said lines.

A still further object of the invention is to provide the machine with an indicator dial bearing characters and words corresponding to the type on the type cylinders and visible through a sight opening in the front of the machine whereby each type may be seen as it is rotated into printing position.

With these and other objects in view as will appear as the description proceeds, the invention comprises the various other novel features of construction, combination and arrangement of parts as will be fully described hereinafter and afterward specifically claimed.

Referring to the drawings Figure 1 represents a vertically longitudinal sectional view taken on a plane indicated by the line 1—1 on Fig. 2.

Fig. 2 represents a sectional plan view taken on a plane indicated by the line 2—2 on Fig. 1.

Fig. 3 represents a sectional plan view taken on a plane indicated by the line 3—3 on Fig. 1.

Fig. 4 represents a vertically longitudinal sectional view taken on a plane indicated by the line 4—4 on Fig. 2.

Fig. 5 represents a transverse sectional view taken on a plane indicated by the line 5—5 on Fig. 2.

Fig. 6 represents a similar view taken on a plane indicated by the line 6—6 on Fig. 2.

Fig. 7 represents a view similar to Fig. 1 showing the machine set and actuated to print single characters.

Fig. 8 represents a similar view showing the machine set and actuated to print words.

Fig. 9 is an end view of the shaft and its associate parts as seen in Fig. 11.

Fig. 10 represents a transverse sectional view taken on a plane indicated by the line 10—10 on Fig. 11.

Fig. 11 represents a plan view of the key shaft and its associated parts.

Fig. 12 represents a sectional view taken on a plane indicated by the line 12—12 on Fig. 11.

Fig. 13 represents a perspective view of the cradle frame.

Fig. 14 represents an end elevation of one of the feed roll carriages and its actuating mechanism operatively associated therewith.

Fig. 15 represents a front elevation of the feed roll carriage.

Fig. 16 represents a vertically sectional view taken on a plane indicated by the line 16—16 on Fig. 15.

Fig. 17 represents a sectional view taken on a plane indicated by the line 17—17 on Fig. 16.

Fig. 18 represents a sectional elevation of the ratchet spacing mechanism for each feed roll carriage.

Fig. 19 represents a diagrammatic plan view of the adjustable check guide bar.

Fig. 20 represents a sectional plan view of the guide bar actuating mechanism and taken in a plane below the table on which the guide bar is laterally adjustable.

Fig. 21 represents a sectional view taken on a plane indicated by the line 21—21 on Fig. 19.

Fig. 22 represents a similar section taken on a plane indicated by the line 22—22 on Fig. 19.

Fig. 23 represents a vertical sectional view taken on a plane indicated by the line 23—23 on Fig 21.

Fig. 24 represents a detail perspective view of the space bar, and

Fig. 25 represents a sectional elevation of the type cylinder locking pawl and its respective rock shaft.

In order that the construction and operation of the invention may be readily comprehended by those skilled in the art to which the invention relates, I have illustrated the preferred embodiment of the invention in the accompanying drawings and will now proceed to fully describe the same in connection with said drawings, in which 1 is the casing bottom, 2 the top, 5 the front wall and 3 and 4 the rear walls. 6 is the left hand side wall while 7 and 8 are the right hand side walls, the upper wall 8 being offset inwardly out of alinement with the wall 7, as clearly shown in Figs. 2 and 6, for a purpose which will presently appear. 9 and 10 are inner vertical walls that extend from the bottom 1 to the top 2 and are arranged in spaced relation to the side wall 6 and the front wall 4, said walls 9 and 10 coöperating with the rear wall 5 and right hand side walls 7 and 8 to form a compartment in the rear right hand end of the casing. A table 11 connects the upper and lower ends of the walls 3 and 4 respectively and extends horizontally through the machine and separates the compartment in the rear right hand corner of the casing into upper and lower compartments. 12, 13 and 14 are spaced partitions arranged transversely of the machine and in the upper inner compartment over said table 11. 15 is a vertical wall extending longitudinally between the side walls 6 and 7 and connecting the walls 3 and 10.

A key shaft 16 is disposed transversely of the machine between the walls 4 and 10 and is journaled in the side walls 6 and 8. A U-shaped rocker frame is mounted on this shaft and as shown more clearly in Figs. 9, 10, 11 and 12, comprises a cross bar 17 terminating at opposite ends in rightangularly disposed co-extensive arms 18. Each of these arms 18 is formed adjacent its end to provide a rectangular recess 19 to receive a bearing block 20 journaled loosely on the key shaft 16. The top and bottom edges of each bearing block are grooved longitudinally to receive tongues 21 and 22 carried by the arm 18 and the bearing strap 23 connected to the broad part of the arm to extend across the recess 19.

Each arm 18 is provided on its lower edge with teeth 24 that are engaged by a toothed segment 25 fixed on the rock shaft 26. One end of the shaft is provided with an arm 27 to which is connected an actuated rod 28. By the actuation of this rod 28 the U-shaped rocker frame is adapted to be moved backward and forward in a substantially horizontal plane on the bearing blocks 20 for a purpose which will later appear.

A bar 29 extends transversely of the machine and serves to support that part of the U-shaped rocker frame remote from the key shaft 16 when the rocker frame is in inoperative position. One of the arms 18 of the rocker frame is provided with a depending arm 30 which is adapted to actuate spacing mechanism that will be later described.

In order to maintain the U-shaped rocker frame in horizontally adjusted position, a leaf spring 31 is positioned in the bottom groove of each bearing block 20 and is supported therein by securing elements 32 passing transversely through the bearing block. The intermediate portion of the spring carries a lug or tooth 33 and is adapted to selectively engage a pair of notches 34 formed in the tongue 21 of the arm 18. When the rod 28 is actuated the lug 33 will ride out of its respective notch and into the adjacent one and while the tension of the leaf springs 31 is sufficient to hold the U-shaped rocker frame in adjusted position yet it is not strong enough to interfere with an easy actuation of the rod 28 through the medium of the shifter key that will be later described.

A rock bar 35 has its opposite ends downturned and rigidly fixed to the key shaft 16 adjacent the inner faces of the bearing blocks 20.

A plurality of key bars or levers 36 are loosely journaled intermediate their ends on the key shaft 16 between the downturned ends of the rock bar 35, there being a key bar for every key of the key board of the machine and one in addition thereto designated at 36′ for the space bar of the key board.

A lug 37 projects upwardly from the intermediate portion of each key bar at a point adjacent the key shaft 16 and is provided with an adjusting screw 38 which is adapted to engage and rock the rock bar 35 when the key bar is actuated. Each key bar is of a length so that its forward end 39 will engage beneath the cross bar 17 of the U-shaped rocker frame and thereby elevate the latter upon each actuation of the key bar. The ends 39 of the key bars are used to elevate the U-shaped rocker frame a predetermined distance when writing single characters. Each key bar is also provided with an upstanding finger 40 which when the key bar is actuated and when the U-shaped rocker frame has been shifted horizontally toward the key board of the machine, or that position shown in Fig. 8, will engage the cross bar 17 of the rocker frame and thus elevate the latter higher than it is possible to do with the end 39. This higher elevation of the rocker frame serves to proportionately increase the actuation of the spacing mechanism to be later described. It is also to be understood that the upstanding finger 40 of the key bars that are used to typewrite words vary in length for variable spacing in direct proportion to the number of letters in the word or plural character type corresponding to the board key actuated, as will be more clearly apparent as the description proceeds.

The upper or rear end of each key bar has an actuating rod 41 connected to it.

42 is a stop bar extending transversely of the machine beneath the rear ends of the key bars and serves to limit the downward movement of the rear end of each key bar when actuated.

A cradle frame, such as is shown in Fig. 13, is loosely mounted on a transversely disposed shaft 43, said shaft being journaled in the side wall 6 and the inner wall 15. This cradle frame embodies a contact bar 44, a lock bar 45 and a lifting arm 46 which projects forwardly from the intermediate portion of the transverse connecting bar 47 which connects the angular sides 48 of the frame and which supports the lock bar 45.

The space bar, shown clearly in Fig. 24 embodies a finger bar 49 having depending members 50 to the lower ends of which are pivotally connected side bars 51 which have their forward ends loosely mounted on the shaft 43 within the cradle frame.

52 is a lug projecting laterally from one of the arms 51 and has connected to it one end of a link 53, the other end of which is connected to the upper rear end of the spacing bar or lever 36' similar to the bars 36 and also mounted on the shaft 16 as clearly shown in Fig. 2. A retractile spring 55 is connected to one of the arms 51 and to the table 11 and serves to return the space bar to normal position after each actuation.

56 indicates one of a plurality of key bar levers which has one end loosely journaled on the shaft 43 and its other end pivotally connected to a key 57. An adjusting screw 58 extends through each lever 56 and is adapted to engage the contact bar 44 of the cradle frame upon actuation of the key 57. A retractile spring 59 connects each lever 56 with the table 11 and serves to return each respective key to normal position after each actuation.

The lower end of the actuating rod 41 of each key bar is threaded and extended loosely through an opening in its corresponding key bar lever 56, and a tension spring 60 is positioned over the lower end of the rod and is held in engagement with the lever 56 by a nut 61 and by which the tension of the spring 60 may be varied at will. This spring 60 compensates for any relative difference in movement that may occur between the lever 56 and its corresponding key bar 36. A stop nut 62 is threaded on the rod 41 immediately above the lever 56 and coöperates with the nut 61 and spring 60 to hold the lever 56 in proper working position.

As shown clearly in Fig. 2 the keys constituting the key board are arranged in spaced parallel rows transversely of the machine and each one of these keys is connected through the mechanism just described to its corresponding key bar on the key shaft 16, but in order to simplify the showing, all of the key bars on the shaft 16 have been omitted with the exception of two (including the bar 36') which will clearly illustrate the operation of the machine. A stop bar 63 is disposed transversely of the machine beneath the table 11 and immediately in advance of each row of keys and serves to limit the upward movement of each row of keys under the action of their respective retractile springs 59.

64 and 65 represent a pair of type cylinders fixed on the shaft 66 journaled in the walls 12, 13 and 14. The type cylinder 64 is provided circumferentially with single characters such as letters and figures while the type cylinder 65 is provided circumferentially with words or plural character type which correspond with the amount indicated by figures on the keys of the key board and which are used to print by a single operation the amount for which the check is drawn on the line below that on which the payee's name is typewritten.

The shaft 66 has a gear 67 fixed on it between the type-cylinder 65 and the wall 13 and meshes with a similar gear 68 fixed on the forward end of an indicator shaft 69 that is extended longitudinally toward the rear of the machine and carries an indicator dial 70 juxta-positioned to the wall 4. The face of the dial 70 is provided with single characters and words corresponding to those appearing on the type cylinders 64 and 65 so that as the dial rotates simultaneously with the rotation of the type-cylinders a vision of the character or word that is being rotated into printing position may be had through the sight opening 71 in the wall 4.

72 represents a driven shaft journaled parallel to the shaft 69 that is provided at its forward end with the gear 73 meshing with the gear 68 and at its rear end with a bevel gear 74 meshing with a segmental gear 75 fixed on the key shaft 16.

A coil spring 76 has one end fixed to the wall 14 and its other end to the type-cylinder or shaft 66 and serves to return the type-cylinders keyed to the shaft 66 back to their normal position after each actuation. 77 indicates a spring having one end connected to the stop bar 42 and its other end to the arm 78 rigidly mounted on the shaft 16 and serves in conjunction with the spring 76 to return the key shaft to its normal position after each actuation.

As clearly shown in Figs. 5 and 6 the type-cylinders are mounted just above the table 11 which is provided with openings 79 in vertical axial alinement with the type-cylinders. The type-cylinders 64 and 65 have operatively associated therewith impression bars 80 and 81 respectively which are identical in construction. Each of these impression bars is hingedly mounted to the side wall 7 as at 82 and projects laterally beneath the table 11 and through an opening 90 in the opposite wall 9.

83 represents an arm pivotally mounted intermediate its ends as at 84 and extending through an opening in the impression bar. The upper end of the arm is provided with a presser foot or platen 85 which is adapted to be swung upwardly to a vertical position and subsequently forced vertically through the opening 79 into printing engagement with the type-cylinder. The lower end of the arm 83 is connected by a bar 86 to one arm of the bellcrank 87 pivoted at 88 to the underside of the impression bar adjacent one end, and links 91 connect the bellcranks 87 to the opposite ends of a walking bar 92, which bar 92 is pivotally supported intermediate its ends by a link 93 connected to the outer end of the lifting arm 46 of the cradle frame. Retractile springs 94 are connected to the free ends of the impression bars and to fixed supports 95 and serve to return the impression bars to normal position after each upward actuation. Each of the arms 83 is provided with a rectractile spring 96 which serves to return said arms to their normal position after each actuation. 97 is a retractile spring connected to the lifting arm 46 and to a fixed support 98 and serves to return the cradle frame to its normal position after each actuation.

A substantially I-shaped frame is slidably mounted in bearings 99 on the opposite side of the slot 90, as clearly shown in Figs. 1, 7 and 8. The upper oppositely disposed alining arms 100 of this frame are mounted for sliding movement across the openings 90 and serve to alternately arrest the upward movement of the impression bars 80 and 81. 101 represents the lower oppositely disposed arms of the slidable frame to one of which is connected the rocker frame 102 by a link 103, said rocker frame being fixed on the rock shaft 104 journaled in bearings on the bottom of the casing. A lever 105 has one end fixed on the rock shaft 104 and its other end pivotally connected to the vertically disposed shifter key 106 provided with a notch 107 adapted to engage the opening in the table 11 through which the key slides to lock the shifter key in depressed position, as clearly shown in Figs. 7 and 8. 108 represents a retractile spring connected to one of the arms 101 and to a fixed support 109 and serves to return the slidable I-shaped frame to its normal position upon the release of the shifter key 106.

After the type-cylinders have been rotated into selected printing position they are adapted to be held in such position through the medium of the spring pressed locking pawl 110 loosely mounted on one end of a rock shaft 111 mounted in suitable bearings on the wall 12. 112 is an arm projecting upwardly from the shaft 111 (see Fig. 25) and is adapted to engage a lug 113 carried by the pawl 110 to move the latter out of locking engagement with the circumferential teeth 114 formed in one end of the type-cylinder 64. A tension spring 115 has one end coiled around and fixed to the shaft 111 and its other end extended upwardly and bearing against the back of the pawl under tension. A retractile spring 116 has one end connected to the wall 12 and the other end to an arm 117 fixed to the shaft 111 and serves to normally hold the locking pawl out of engagement with the type-cylinder 64. The tension of this spring 116 is of course slightly greater than that of the spring 115 so that said parts will rock away from the type-cylinder in unison yet allow of the locking pawl to yield against the tension of the spring 116 when the shaft 111 is rocked by the upward movement of the lifting arm 46 in making an impression which will be more clearly apparent as the description proceeds.

The opposite end of the rock shaft 111 is provided with an arm 118 which carries an anti-friction roller 119 which bears on the upper edge of the lifting arm 46. From this construction it will be apparent that each time the lifting arm 46 moves upwardly that the pawl 110 will be drawn into locking engagement with the type-cylinder 64 and thus not only holds the latter cylinder in locked position but also the type-cylinder 65.

The machine is provided with a pair of check feed roller carriages which are adapted to either automatically or manually feed the check through the machine or shift the check from one printing position to another. Since both of the feed roller carriages are substantially identical in construction it is believed that the description of one will suffice for both. Referring particularly to Figs. 3, 4, 14, 15, 16, 17 and 18, it will be seen that each feed roller carriage is slidably mounted on a pair of spaced parallel shafts 120 and 121 disposed transversely of the machine and journaled in the walls 7 and 9. The carriage proper consists of a pair of side plates 122 and 123 connected by a cross bar 124. 125 represents the feed roller fixed on the sleeve 126 slidably feathered on the shaft 121. A sleeve 127 is slidably feathered on the shaft 120 and carries rigidly mounted arms 128 positioned at points adjacent its opposite ends. A bearing roller 129 is journaled between the free ends of these arms and normally bears upon the feed roller 125. This roller is held in engagement with the roller 125 under tension through the medium of the tension springs 130.

131 represents an arm depending from the shaft 120 and is connected by a rod 132 to an arm 133 projecting upwardly from the rock shaft 134 journaled in suitable bearings on the bottom of the casing adjacent the rear end thereof. 135 is a check release lever fixed to the rock shaft 134 and projects rearwardly through an opening in the wall 3. By each depression of the lever 135 the bearing rollers 129 will be lifted off of the feed rollers 125, and immediately upon the release of the lever 135 said bearing rollers will return into engagement with the feed rollers and the lever 135 with its directly associated parts will return to their normal position under the tension of the retractile spring 136 connected to the rod 132 and to the wall 10. By the actuation of the check release lever, the check may be slid into or through the machine and adjusted as desired.

Each feed roller carriage is provided with ratchet mechanism and comprises a ratchet wheel 137 mounted on the end of the shaft 121 and adapted to be actuated by a spring pressed pawl 138 pivotally supported intermediate its ends between hanger arms 139 suspended from the shaft 121 and pivotally attached to the actuating bar 140. This bar as clearly shown in Fig. 3 is of angular formation and has its inner end connected to the depending arm 30 of the U-shaped rocker frame by a link 141. From this construction it will be apparent that each time the U-shaped rocker frame is actuated by one of the keys of the key board that the pawls will ratchet over the ratchet wheels 137 a corresponding distance so that upon the release of the key that was depressed the ratchet mechanism will feed the check through the machine under the tension of the retractile spring 140ª, shown in Fig. 4, a number of spaces corresponding to the character or number of letters in the word printed and one additional space which serves as a spacing between the characters or words being printed.

142 represents a cam shaft extending longitudinally through the lower part of the machine and is provided at its rear end with the thumb nut 143 having a spring detent 144 on its inner face which is adapted to engage the rear wall 3 to hold the cam shaft in adjusted position. 145 represent cams fixed on the shaft 142 and are each operatively engaged by a friction roller 146 journaled in the lower end of a vertically disposed adjusting bar 147, the upper end of which is pivotally connected as at 148 to the feed roller carriage. Each adjusting bar 147 is connected by retractile spring 149 to the side wall 7 so that the friction roller 146 may be always maintained in engagement with its respective cam.

Each of the bars 147 has one end of the horizontal rod 150 pivotally connected to it intermediate its ends while the other end is connected to one arm 151 of a bellcrank pivotally supported by the wall 9. The other arm 152 of each bellcrank projects through an opening 153 in the wall 9 and is engaged by a friction roller 154 carried by the arms 101 of the I-shaped slidable frame mounted on the wall 9. 155 represent coil springs on the shafts 120 and 121 positioned between the feed roller carriages and the adjacent side wall 8 and serve to normally hold the feed roller carriages in position for printing single characters by the type-cylinder 64. It will also be apparent from the construction just described that when it is desired to print words the shifter key 106 is depressed which through the medium of the I-shaped slidable frame and its associated parts actuating on the bell-crank arms 152 will in turn shift the feed roller carriages laterally of the machine and thus shift the check held by them laterally into proper printing position for the typewriting of words on the line below the payee's name. After the word corresponding to the amount of the check has been printed on this line, and the shift key released the feed roller carriages will return to their normal position under the expansive force of the springs 155.

The throw of the feed roller carriages can be predetermined by the adjustment of the cams 145 which is necessary since the width of the space between the line for the payee's name and the line for the amount varies in the checks issued by different banks. Therefore by this adjusting means the machine can be adjusted to receive and print any standard check irrespective of the distance between the lines thereon.

150 is an upstanding indicator arm fixed on the cam shaft 142 and projecting upwardly to the point immediately above the table 11 and has a finger or pointer 157 rigidly connected to its upper end to project laterally through a slot in the rear wall 4. By the provision of this pointer or finger 157 any movement or adjustment of the feed roller carriages may be readily seen and accurately determined. This pointer 157 is designed to coöperate with a fixed pointer 158 carried by the wall 4 and arranged in vertical axial alinement with the type-cylinders and serves to indicate the amount of shift movement of the feed rollers for plural character type.

In order to adjust the check laterally on the table 11 so that the line for the payee's name may aline with the pointer 158, I have provided the table 11 with a guide bar 159 which is rigidly attached to adjustable parts 160 slidably mounted within slots 161 formed in the table 11. A U-shaped frame has its transverse portion 162 rigidly connected to the side 122 of one of the feed roller carriages so as to slidably bear against the under surface of the table 11 as clearly shown in Figs. 21, 22 and 23. The side arms 163 of the U-shaped frame are each provided with a longitudinal slot 164 and positioned centrally beneath the opening 161 in the table and form a support for the slidable plate 160, the upper surface of which is flush with that of the table. A retaining block 165 depends from each plate 160 and is recessed in its lower edge to receive the rotatable shaft 166 which is journaled in the arms 163. A strap 167 extends across the recessed bottom edge of the retaining block 165 and beneath the shaft 166 and serves to hold the adjustable plate 160 within the slot or opening 161. The underface of the plate 160 is provided with rack teeth 168 which mesh with a pinion 169 keyed on the shaft 166. The rear end of this shaft is provided with a thumb piece 170 whereby it may be rotated to adjust the bar 159 laterally of the machine.

171 and 172, indicated in Fig. 2, represent indicator points which serve to indicate to the operator, during the insertion of the check into the machine, when the beginning of the lines on which the payee's name and the next line below on which the amount is written are in position to begin typewriting thereon.

Each of the type-cylinders is provided with an inking roller 173 journaled in a bracket 174, as clearly shown in Fig. 6.

In the operation of the machine it is first set to print exactly on the line of the check that is to be filled out and in order to do this, the blank check is positioned on the table 11, so that its bottom edge rests against the guide bar 159, after which the thumb piece 170 is turned and the line on the check for the payee's name and the amount is brought into longitudinal alinement with the stationary pointer 158 which will indicate to the operator that the check is in proper position for printing single characters.

The machine having been set to print directly on the line containing the payee's name, it is then adjusted so that it will print or typewrite directly on the next line below and in order to do this the thumb piece 143 is rotated which will adjust both feed roller carriages simultaneously through the medium of the cams 145, to have the proper throw upon the depression of the shifter key 106 which shifts the check from one printing position to the other or from printing single characters to words. This adjustment just mentioned can be accurately determined by the adjustable pointer 157 which is moved over until it is in direct alinement with the line on which the amount is to be written.

The check release lever 135 is then depressed and the check pushed into the machine until the beginning of the line for the payee's name is in transverse alinement with the indicator point 171 after which the check release lever 135 is released which will allow of it being gripped in the first feed roller carriage.

The machine is then ready for printing the payee's name and the amount in figures for which the check is to be drawn, as will be apparent by reference to Fig. 1. In order to print the payee's name and the amount just mentioned, a key 57 must be depressed for each letter or single character and the space bar 49 must be depressed to provide a space between the initials and the name of the payee or any additional space desired between any other single characters.

To print the first letter of the payee's name, the key 57 is depressed from the position shown in Fig. 1 to that shown in Fig. 7 which rocks the key bar 36 on the shaft 16 until its adjusting screw 38 comes into engagement with and rocks the rock bar 35 over the proper distance to cause the type on the type-cylinder 64 corresponding to the key depressed to rotate into printing position. This actuation of the key bar 36 also causes its forward end 39 to move upwardly into engagement with the cross bar 17 of the U-shaped rocker frame and at the same time elevate this rocker frame a distance sufficient to cause the depending arm 30 thereof to set the spacing mechanism so that when the key 57 is released the spacing mechanism will automatically shift the check through the machine two spaces, that is, one space for the character that has been printed and one space to move the check along to print the next character. In other words every time a single character is printed in writing the payee's name or the amount on the same line the ratchet pawls 138 ratchet over two teeth on the ratchet wheels 137 so that when the key 57 is released the spring 140ª, Fig. 4, will rotate the feed rollers 125 a distance of two spaces thus moving the check through the machine a corresponding distance. This operation just described above takes place before the adjusting screw 58 of each lever bar 56 comes into contact with the contact bar 44 of the cradle frame so that the forward end of the particular key bar 36 actuated may be elevated clear of the lock bar 45. The complete depression of the key 57 will rock the cradle frame on the shaft 43 until the lock bar 45 is engaged over the ends 39 of all the keys except the one that has been actuated and thus hold all of the keys in their normal position against casual movement. At this point it will also be apparent that since the stop bar 42 limits the downward movement of the rear end of each key bar 36 that the spring 60 will compensate for the difference in movement between the actuating rod 41 and the lever bar 56.

At the same time that the cradle frame is actuated, its lifting arm 46 will by virtue of its engagement with the roller 119 rock the shaft 111 and throw the pawl 110 into locking engagement with the teeth 114 on the end of the type-cylinder 64 thus locking it in printing position while an impression is being made.

By particular reference to Figs. 1, 3 and 7 it will be apparent that the left hand arm 100 of the I-shaped slidable frame is positioned across the left hand opening 90 and over the end of the impression bar 81, while the right hand arm 100 is removed from across the right hand opening 90 so that the end of the adjacent impression bar 80 is free to move up and down within the opening 90. From this it will be apparent that as the lifting arm 46 moves upwardly it will first lock the type-cylinder 64 against rotation and by continued upward movement will lift the bell-crank arm 89, which in turn will rock the presser foot or platen 85 into vertical position so that as the impression bar 80 is further elevated the presser foot will be forced vertically through the opening 79 in the table 11 into printing engagement with the type-cylinder to make an impression on the check operatively positioned therebetween. At the same time that the type-cylinder 64 is rotated into printing position, the indicator dial 70 will simultaneously rotate and will indicate through the sight opening 71 in the wall 4 the exact character or word that has been moved into printing position. Immediately after the printing of the letter or character and the release of key 57, all of the parts will return to their normal position at the same time automatically feeding the check through the machine the proper number of spaces. This operation just described in connection with the depression of the key 57 and the printing of a single character is repeated successively until the payee's name has been typewritten and the amount in figures for which the check is to be drawn has been typewritten on the first line of the check.

The machine having been previously adjusted to accurately print on the next line below that which contains the payee's name, the shifter key 106 is depressed into the position shown in Fig. 8 which automatically sets the different mechanisms of the machine for printing words and spaces therebetween. This depression of the shifter key automatically shifts both feed roller carriages laterally against the tension of the spring 155 so as to position the second line or the line on which the amount is to be typewritten in vertical alinement with the type-cylinder 65. The check is then moved through the machine until the beginning of the line just mentioned is opposite the indicator point 172 which will indicate that the check is in proper printing position. The check can be moved to this position either manually by actuating the check release lever 35 or by actuating the space bar 49 successively until the check automatically moves into the proper printing position.

The depression of the shifter key 106 also shifts the U-shaped rocker frame on the bearing blocks 20 into the position shown in Fig. 8 which shifts the cross bar 17 of the rocker frame rearwardly into the vertical arc of movement of the finger 40 of the key bar 36. Thus it will be apparent that when the key bar 36 is actuated the finger 40 will engage the cross bar 37 of the rocker frame and elevate it higher than is the case when it is engaged by the end 39. This increased movement of the U-shaped rocker frame imparts a corresponding increased movement of the spacing mechanism. The fingers 40 of the key bars 36 vary in length and are each adapted to lift the U-shaped rocker frame a distance sufficient to actuate the spacing mechanism a number of spaces equal to the number of letters in the word corresponding to the key depressed and plus one additional space for spacing between the word being printed and the next word to be printed. For instance, if it is desired to print the word five, the finger 40 would be long enough to actuate the spacing mechanism five spaces, four spaces for the four letters in the word and one space for the space between the word printed and the next word to be printed, if such should be desirable. The rotation of the type on the cylinder 65 corresponding to the key depressed will also be governed by the throw of the rock bar 35 through the adjusting screw 38.

After the type-cylinder 65 has been rotated into the desired printing position, the impression of the type on the check is made in substantially the same manner as has been described in connection with printing single characters, the only difference being that the I-shaped slidable frame has been shifted so that instead of the impression bar 80 being elevated when the lifting arm 46 is raised, the impression bar 81 is elevated and its corresponding presser foot or platen actuated in the manner hereinbefore described. After the amount has been typewritten by a single word or words, the shifter key is released and all of the parts returned to their normal position for writing the next check.

While I have described the principle of the operation of the invention which I consider to be the best embodiment thereof, I desire to have it understood that such changes in construction and arrangement of parts may be made when desired as are within the scope of the appended claims.

Having thus described my invention what I desire to secure by Letters Patent is:

1. A typewriter embodying two sets of different type arranged to print at different points, keys controlling the type, variable-spacing paper feeding means controlled by the keys and operable for moving a sheet past one point for the operation of one set of type and then past the other point for the operation of the other set of type, said feeding means being shiftable to change the position of the sheet after passing the first point, and means operable to shift said feeding means and condition the same for different spacing for the operation of the second set of type.

2. A typewriting machine embodying two sets of different type arranged to print at two different points of the machine, keys controlling the type, paper feeding means controlled by the keys and operable for feeding a sheet past one of said points for the operation of one set of type and then past the other point for the operation of the other set of type, and means for shifting the feeding means during the travel of the sheet from the first to the second point to change the position of the sheet for the operation of the second set of type.

3. A typewriter comprising rotatable type-cylinders, a plurality of operating keys, means for operatively connecting said keys to said type-cylinders whereby the latter can be rotated, a platen to coöperate with each of said type-cylinders, and means for selectively nullifying the printing function of said type-cylinders.

4. In a typewriting machine, two sets of type operable at different positions, keys controlling said type, variable-spacing feeding means controlled by the keys for feeding a sheet past one set of type and then past the other set and shiftable to change the position of the sheet after the operation of the first set of type, and mechanism for selectively nullifying the printing function of either set of type, for shifting the feeding means to change the position of the sheet, and for simultaneously changing the control of the feeding means by the keys according to the set of type to be operated.

5. In a typewriter, a pair of type cylinders rotatable side by side about a common axis, a set of keys controlling said cylinders to position them, variable spacing paper feeding means controlled by the keys for feeding a sheet past one cylinder and then past the other and shiftable to shift the sheet laterally of its line of movement past the cylinders, and means for shifting the feeding means and for simultaneously changing the control of the feeding means by the keys when changing from one cylinder to the other.

6. In a typewriter, a variable-spacing feeding mechanism including a shaft, key-operated bars mounted for rocking movement on said shaft, a rocking frame mounted on said shaft, sheet moving means operated by said frame, said frame and bars being shiftable relatively on said shaft, to change their relative position, and said frame and bars having portions coöperable with one another in the different relative positions of the frame and bars to change the movement of the frame by the bars.

7. In a typewriter, a pair of rotatable type-cylinders, a plurality of keys for rotating said type-cylinders, means for feeding a check beneath said type-cylinders, impression means for each of said type-cylinders, means for selectively nullifying the action of either of said impression means, and means to selectively actuate said impression means.

8. In a typewriter, a pair of rotatable type-cylinders, a pair of feed roller carriages immediately below said type-cylinders, means for feeding a check through said feed roller carriages beneath the type-cylinders, and means for shifting said feed roller carriages laterally beneath the type-cylinders.

9. In a typewriter, a pair of rotatable type-cylinders, a pair of feed roller carriages arranged in a plane immediately below said type-cylinders, means for feeding a check through said feed roller carriages, a shifter key for simultaneously shifting said feed roller carriages laterally, and spring tension means for returning said feed roller carriages to their normal position after each actuation of the shifter key.

10. In a typewriter, the combination with rotatable type-cylinders, of a pair of feed roller carriages mounted in a plane immediatly below said type-cylinders, means for simultaneouly shifting said feed roller carriages laterally, spring tension means for returning the feed roller carriages to their normal position immediately after the actuation of the shifter means, and means for adjusting and controlling the lateral throw of said feed roller carriages.

11. In a typewriter, the combination with a pair of rotatable type-cylinders, of a pair of feed roller carriages positioned in a plane immediately below said type-cylinders, means for simultaneously shifting the feed roller carriages laterally, and means for predetermining the lateral throw of said feed roller carriages.

12. In a typewriter, the combination with a pair of rotatable type-cylinders, means to adjust a check laterally of the machine into initial printing position, feed roller carriages arranged below said type-cylinders, means for feeding the check through said feed roller carriages, means for simultaneously shifting the feed roller carriages and the check laterally beneath said type-cylinders into the second printing position, and means for predetermining the lateral shifting of said feed roller carriages and check carried thereby.

13. In a typewriter, a pair of rotatable type-cylinders, impression means for each of said type-cylinders, feed roller carriages slidably mounted in a plane immediately below said type-cylinders, and shifter means for simultaneously shifting said feed roller carriages laterally and nullifying one of said impression means.

14. A typewriter comprising a pair of type-cylinders, impression means for each of said type-cylinders, feed roller carriages slidably mounted in a plane below said type-cylinders, a plurality of keys, means for operatively connecting said keys to said type-cylinders, feed roller carriages slidably mounted in a plane below said type-cylinders, ratchet mechanism for each of said feed roller carriages, means connecting said first named key connecting means with said ratchet mechanisms whereby when each key is actuated said ratchet mechanisms will be set for spacing, and spring tension means for actuating said ratchet mechanisms immediately upon the release of the actuated key.

15. In a typewriter, a pair of feed roller carriages, means for adjusting and predetermining the lateral shifting movement of said feed roller carriages, indicator means to determine the adjustment of said feed roller carriages, and a shifter key for shifting said feed roller carriages laterally the predetermined amount of movement.

16. In a typewriter, a pair of feed roller carriages, means for adjusting and predetermining the lateral shifting movement of said feed roller carriages, indicator means to determine the adjustment of said feed roller carriages, a shifter key for shifting said feed roller carriages laterally the predetermined amount of movement, and spring tension means for returning said feed roller carriages to their normal position immediately after the release of said shifter key.

17. In a typewriter a pair of rotatable type-cylinders, a fixed indicator to indicate when the first line of a check is in longitudinal alinement with said type-cylinders, manually operable means for adjusting the check laterally of the machine until the first line of the check is in longitudinal alinement with said fixed indicator, feed roller carriages slidably mounted below said type-cylinders, means for predetermining the lateral shifting movement of said carriages, indicator means fixed to said predetermining means and adapted to coöperate with said fixed indicator to determine the shifting movement of said feed roller carriages with respect to the width of the space between the first and second lines of the check, and means for shifting said feed roller carriages the predetermined distance.

18. In a typewriter a pair of slidably mounted feed roller carriages, means for shifting said feed roller carriages simultaneously, a check guide bar carried by one of said feed roller carriages, and means for adjusting said guide bar with respect to said feed roller carriages.

19. In a typewriter the combination with a pair of rotatable type-cylinders, of pairs of shafts disposed at right angles to said type-cylinders, a feed roller carriage slidably mounted on each pair of shafts, manually operable means for adjusting and predetermining the shifting movement of the feed roller carriages on said shafts, a shifter key for shifting said feed roller carriages the predetermined distance, and spring tension means for returning said feed roller carriages to their normal position after the release of said shifter key.

20. In a typewriter the combination with a pair of rotatable type-cylinders, of pairs of shafts arranged at right angles to the type-cylinders, a feed roller carriage slidably mounted on each pair of shafts, a manually operable cam means for adjusting and predetermining the lateral shifting movement of said feed roller carriages, a shifter key for simultaneously shifting the feed roller carriages the predetermined distance, and spring tension means for returning the feed roller carriages to their normal position after the release of said shifter key.

21. In a typewriter a pair of rotatable type-cylinders, a plurality of keys operably connected to said type-cylinders, means for holding a check in printing position beneath each type-cylinder, means for automatically feeding the check beneath said type cylinders a distance corresponding to the character or number of letters in each word plus one space, and means for shifting the check laterally beneath said type-cylinders from first to second printing position.

22. A typewriter comprising a pair of simultaneously rotatable type-cylinders arranged to rotate on a horizontal axis, a plurality of type disposed parallel to the axes of said type-cylinders and arranged circumferentially thereof, a plurality of operating keys corresponding to the type on said type-cylinders, means for operatively connecting said keys to said type-cylinders whereby when the keys are operated the type-cylinders will be rotated, adjustable means whereby each key may cause the type-cylinders to rotate to bring the type corresponding to the key depressed into printing position, means for holding said type-cylinders against rotation when in printing position, a platen to coöperate with each type-cylinder, and means for selectively actuating said platens to make an impression of the type after the type disk has been locked in printing position.

23. A typewriter comprising a pair of simultaneously rotatable type-cylinders, longitudinal rows of type spaced circumferentially of said type-cylinders, a plurality of operating keys corresponding to the number of type on said type-cylinders, means for operably connecting said operating keys with said type-cylinders, adjusting means for each of said keys whereby the type disk will be rotated a predetermined distance, a platen adapted to coöperate with each type-cylinder, and means for selectively actuating each platen to coöperate with its respective type-cylinder.

24. A typewriter comprising a rotatable type-cylinder, a platen coöperating with the type-cylinder, a key shaft, a plurality of operating keys mounted loosely on said key shaft, means interposed between said key shaft and the type-cylinder whereby it will be rotated upon the depression of any one of said keys, adjusting means for each key whereby the type-cylinder will be rotated a predetermined distance, an auxiliary shaft, actuating means interposed between the auxiliary shaft and said platen, a plurality of key bar levers loosely mounted on said auxiliary shaft, and a key rod connected between each of said key bars and said key bar levers whereby the initial depression of any one of said key levers will cause the type-cylinder to rotate a predetermined distance and by a continued depression will cause the platen to coöperate with the type-cylinder to make an impression.

25. A typewriter comprising a rotatable type-cylinder, a key shaft, means operably connecting said key shaft with said type-cylinder, a rock bar fixed to said key shaft, a plurality of key bars loosely mounted on said key shaft, means for actuating said key bars, and an adjusting screw carried by each key bar and adapted to engage and actuate said rock bar to determine the rotation of said type-cylinder.

26. A typewriter comprising a rotatable type cylinder, a key shaft, means operably connecting said key shaft with said type-cylinder, a rock bar fixed to said key shaft, a plurality of key bars loosely mounted on said key shaft, means for actuating said key bars, an adjusting screw carried by each key bar and adapted to engage and actuate said rock bar to determine the rotation of said type-cylinder, and means to limit the movement of each key bar.

27. In a typewriter, a rotatable type-cylinder, a key shaft, means operably connecting the key shaft to said type-cylinder, a rock bar secured on said shaft, a plurality of key bars loosely mounted on said key shaft, adjustable means carried by each key bar adapted to engage and actuate said rock bar, a rocker frame mounted on said key shaft, the key bars having portions to engage and move the rocker frame spacing mechanism, and means connecting said rocker frame with said spacing mechanism, whereby the spacing mechanism will be actuated upon the actuation of each key bar.

28. In a type-writer, spacing mechanism, a key shaft, a rocker frame mounted on said key shaft, means connecting said rocker frame with said spacing mechanism, a plurality of key bars loosely mounted on said key shaft, means connected to one end of each key bar for actuating it, the other end of each key bar being adapted to engage the rocker frame and actuate it correspondingly to operate said spacing mechanism, and means for limiting the actuation of each key bar to determine the actuation of said spacing mechanism.

29. In a typewriter, spacing mechanism, a key shaft, a plurality of key bars loosely mounted on said key shaft, fingers carried by each key bar adjacent its forward end, said fingers varying in length corresponding to the number of letters and one additional space in each word to be printed, a rocker frame loosely mounted on said key shaft, means for shifting said rocker frame in a direction at right angles to said key shaft and into the vertical arc of movement of said key bar fingers, means for connecting said rocker frame with said spacing mechanism, and means for giving each key bar the same amount of throw.

30. In a typewriter a key shaft, bearing blocks mounted on said key shaft, a rocker frame slidably mounted on said bearing blocks, means for shifting said rocker frame on said bearing blocks in a direction at right angles to said key shaft, and a spring detent for holding said rocker frame in shifted position.

31. In a typewriter a key shaft, a plurality of key bars loosely mounted on said key shaft, an auxiliary shaft, a plurality of key bar levers mounted on said auxiliary shaft, means connecting said levers to said key bars, a cradle frame mounted on said auxiliary shaft, and a lock bar carried by said cradle frame and adapted to be swung into locking engagement with all of the key bars except the one actuated when said cradle frame is actuated by any one key bar lever.

32. In a typewriter, a pair of rotatable type-cylinders, a key shaft, means operably connecting the key shaft with said type-cylinders, a plurality of key bars mounted on said key shaft, an auxiliary shaft, a cradle frame mounted on said auxiliary shaft, a plurality of key bar levers mounted on said auxiliary shaft, means connecting said key bars with said levers, impression means for said type-cylinders, connecting means interposed between said cradle frame and said impression means, and means for nullifying the action of one of said impression means, the other impression means adapted to be actuated upon the depression of one of said key bar levers into engagement with said cradle frame.

33. In a typewriter, a pair of simultaneously rotatable type-cylinders, impression means for each of said type-cylinders, feed roller carriages slidably mounted below said type-cylinders, means for simultaneously nullifying the action of one of said impression means and shifting said feed roller carriages laterally, and a shifter key for actuating said last named means.

In testimony whereof I have signed my name to this specification in the presence of two subscribing witnesses.

CHARLES WENDELKEN.

Witnesses:
 A. L. Cox,
 T. A. STAFFORD.